United States Patent
Fu et al.

(10) Patent No.: US 9,595,862 B1
(45) Date of Patent: Mar. 14, 2017

(54) MULTI-LEVEL INVERTER SYSTEMS

(71) Applicant: Futurewei Technologies, Inc., Plano, TX (US)

(72) Inventors: Dianbo Fu, Plano, TX (US); Yunfeng Liu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/949,568

(22) Filed: Nov. 23, 2015

(51) Int. Cl.
*H02M 7/48* (2007.01)
*H02M 1/12* (2006.01)
*H02M 7/537* (2006.01)

(52) U.S. Cl.
CPC .............. *H02M 1/12* (2013.01); *H02M 7/537* (2013.01)

(58) Field of Classification Search
CPC ........ H02M 1/12; H02M 1/14; H02M 1/4266; H02M 2001/123; H02M 3/285; H02M 7/49; H02M 7/493
USPC ...................................................... 363/40, 71
See application file for complete search history.

(56) References Cited

U.S. PATENT DOCUMENTS

| 5,933,339 A * | 8/1999 | Duba ..................... H02M 7/49 363/41 |
| 2015/0085541 A1* | 3/2015 | Hu ....................... H02M 7/487 363/71 |

OTHER PUBLICATIONS

Hu, X., et al. "Analysis of Topology and PWM Strategy for a New Multiple Input and Multilevel Inverter," Power Electronics for Distributed Generation Systems, Jun. 18, 2010, pp. 292-294.

* cited by examiner

*Primary Examiner* — Adolf Berhane
*Assistant Examiner* — Afework Demisse
(74) *Attorney, Agent, or Firm* — Slater Matsil, LLP (57) ABSTRACT

A system comprises a first T-type inverter and a second T-type inverter connected to a dc power source and a first winding of a transformer, wherein the second T-type inverter is configured to operate with a first phase shift from the first T-type inverter, a third T-type inverter and a fourth T-type inverter connected to the dc power source and a second winding of the transformer, wherein the fourth T-type inverter is configured to operate with a second phase shift from the third T-type inverter and a fifth T-type inverter and a sixth T-type inverter connected to the dc power source and a third winding of the transformer, wherein the sixth T-type inverter is configured to operate with a third phase shift from the fifth T-type inverter.

20 Claims, 7 Drawing Sheets

MULTI-LEVEL INVERTER SYSTEMS

TECHNICAL FIELD

The present disclosure relates to a multi-level inverter system, and, in particular embodiments, to a five-level inverter system.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of multilevel inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NCP) inverter. A three-level NCP inverter requires two series connected capacitors coupled between the input dc buses. Each capacitor is charged to an equal potential. Furthermore, the three-level NCP inverter may comprise four switching elements and two clamping diodes. The clamping diodes help to reduce the voltage stress on the switching element to one capacitor voltage level.

An NCP inverter utilizes a staircase waveform to generate an ac output. Such a staircase waveform resembles a desired sinusoidal waveform. As a result, the output voltage of the NCP inverter may be of a low total harmonic distortion (THD). In addition, the staircase waveform may reduce the voltage stresses. As a result, the electromagnetic compatibility (EMC) performance of the NCP inverter may be improved. In addition, to achieve the same THD, the NCP inverter may operate at a lower switching frequency. Such a lower switching helps to reduce switching losses so as to achieve an efficient power conversion system.

SUMMARY

In accordance with an embodiment, a system comprises a first five-level inverter comprising a first three-level inverter and a second three-level inverter configured to operate with a first phase shift between the first three-level inverter and the second three-level inverter, a second five-level inverter comprising a third three-level inverter and a fourth three-level inverter configured to operate with a second phase shift between the third three-level inverter and the fourth three-level inverter, a third five-level inverter comprising a fifth three-level inverter and a sixth three-level inverter configured to operate with a third phase shift between the fifth three-level inverter and the sixth three-level inverter, a transformer having three primary windings and three secondary windings, wherein a first primary winding is coupled to the first five-level inverter, a second primary winding is coupled to the second five-level inverter and a third primary winding is coupled to the third five-level inverter and an output filter connected to the three secondary windings.

In accordance with another embodiment, a system comprises a first T-type inverter and a second T-type inverter connected to a dc power source, wherein the second T-type inverter is configured to operate with a first phase shift from the first T-type inverter, and wherein the first T-type inverter and the second T-type inverter are connected to a first winding of a transformer, a third T-type inverter and a fourth T-type inverter connected to the dc power source, wherein the fourth T-type inverter is configured to operate with a second phase shift from the third T-type inverter, and wherein the third T-type inverter and the fourth T-type inverter are connected to a second winding of the transformer and a fifth T-type inverter and a sixth T-type inverter connected to the dc power source, wherein the sixth T-type inverter is configured to operate with a third phase shift from the fifth T-type inverter, and wherein the fifth T-type inverter and the sixth T-type inverter are connected to a third winding of the transformer.

In accordance with yet another embodiment, a three-phase inverter system comprises a first phase comprising a first three-level inverter and a second three-level inverter connected together through a first winding of a transformer, wherein the first three-level inverter is configured to operate with a first phase shift from the second three-level inverter, a second phase comprising a third three-level inverter and a fourth three-level inverter connected together through a second winding of the transformer, wherein the third three-level inverter is configured to operate with a second phase shift from the fourth three-level inverter, a third phase comprising a fifth three-level inverter and a sixth three-level inverter connected together through a third winding of the transformer, wherein the fifth three-level inverter is configured to operate with a third phase shift from the sixth three-level inverter and the transformer having primary side windings connected to the first phase, the second phase and the third phase respectively and secondary side windings connected to an output filter.

An advantage of an embodiment of the present disclosure is a multi-level inverter providing higher efficiency.

The foregoing has outlined rather broadly the features and technical advantages of the present disclosure. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a transformer structure for connecting two phase-shifted three-level inverters to generate a five-level waveform. The disclosure may also be applied, however, to a variety of multi-level inverter systems. Hereinafter, various embodiments will be explained in detail with reference to the accompanying drawings.

Figure 1:
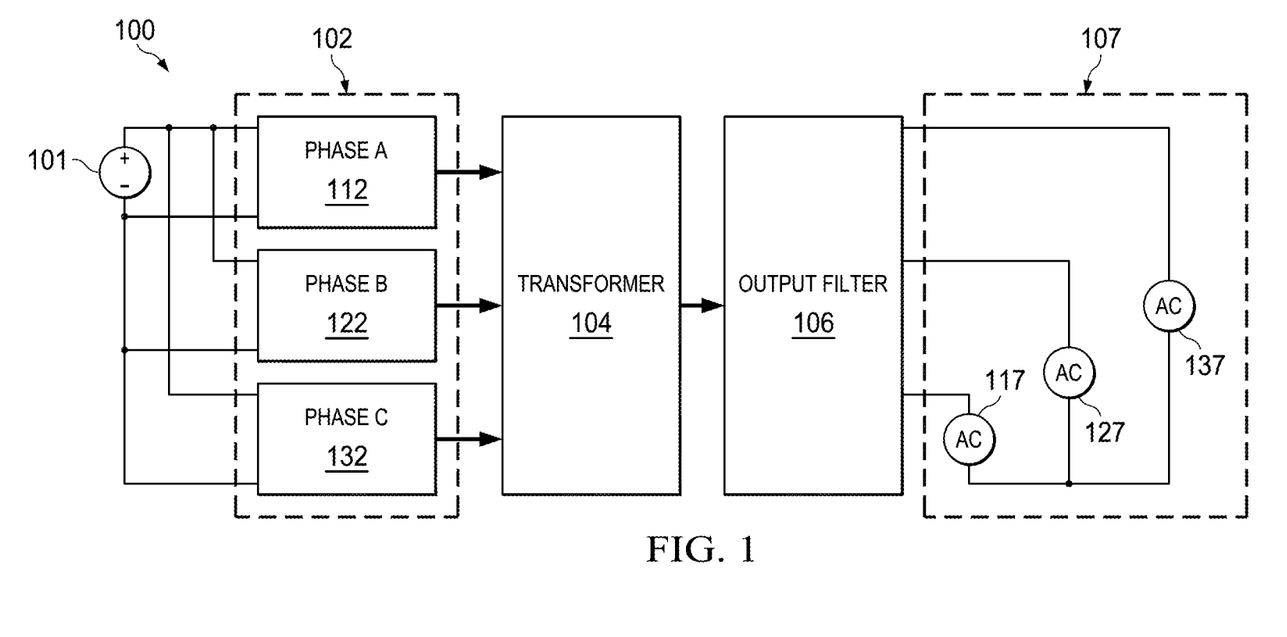
FIG. 1 illustrates a block diagram of a multi-level inverter system in accordance with various embodiments of the present disclosure.

FIG. 1 illustrates a block diagram of a multi-level inverter system in accordance with various embodiments of the present disclosure. The multi-level inverter system 100 comprises an input dc power source 101, a multi-level three-phase inverter 102, a transformer 104, an output filter 106 and a three-phase load 107. The three-phase load 107 includes a first ac load 117, a second ac load 127 and a third ac load 137. In some embodiments, the first ac load 117, the second ac load 127 and the third ac load 137 form a balanced three-phase load. Such a balanced three-phase load helps all the phase conductors carry the same power. As a result, the phase conductors can be the same size.

In some embodiments, the multi-level three-phase inverter 102 may comprise three inverter cells for three phases of the multi-level inverter system 100. As shown in FIG. 1, a first phase (e.g., phase A shown in FIG. 1) of the multi-level three-phase inverter 102 is implemented as a first five-level inverter 112. A second phase (e.g., phase B shown in FIG. 1) of the multi-level three-phase inverter 102 is implemented as a second five-level inverter 122. A third phase (e.g., phase C shown in FIG. 1) of the multi-level three-phase inverter 102 is implemented as a third five-level inverter 132.

In some embodiments, the five-level inverters (e.g., the first five-level inverter 112) are formed by connecting two phase-shifted three-level inverters together through a winding of the transformer 104. More particularly, in each phase, there may be two three-level inverters. There is a phase shift between these two three-level inverters. The outputs of these two three-level inverters are connected together through a winding of the transformer 104. As a result, there is a five-level waveform applied to the winding of the transformer 104.

Each three-level inverter of the multi-level three-phase inverter 102 inverts a dc waveform received from the input dc power source 101 to a three-level ac waveform. In some embodiments, each three-level inverter may comprise a plurality of switching elements such as insulated gate bipolar transistor (IGBT) devices. Alternatively, each inverter unit may include other types of controllable devices such as metal oxide semiconductor field effect transistor (MOSFET) devices, bipolar junction transistor (BJT) devices, super junction transistor (SJT) devices, bipolar transistors and/or the like.

In some embodiments, the three-level inverter may be a T-type three-level inverter. The detailed operation and structure of the T-type three-level inverter will be described below with respect to FIG. 2.

Figure 2:
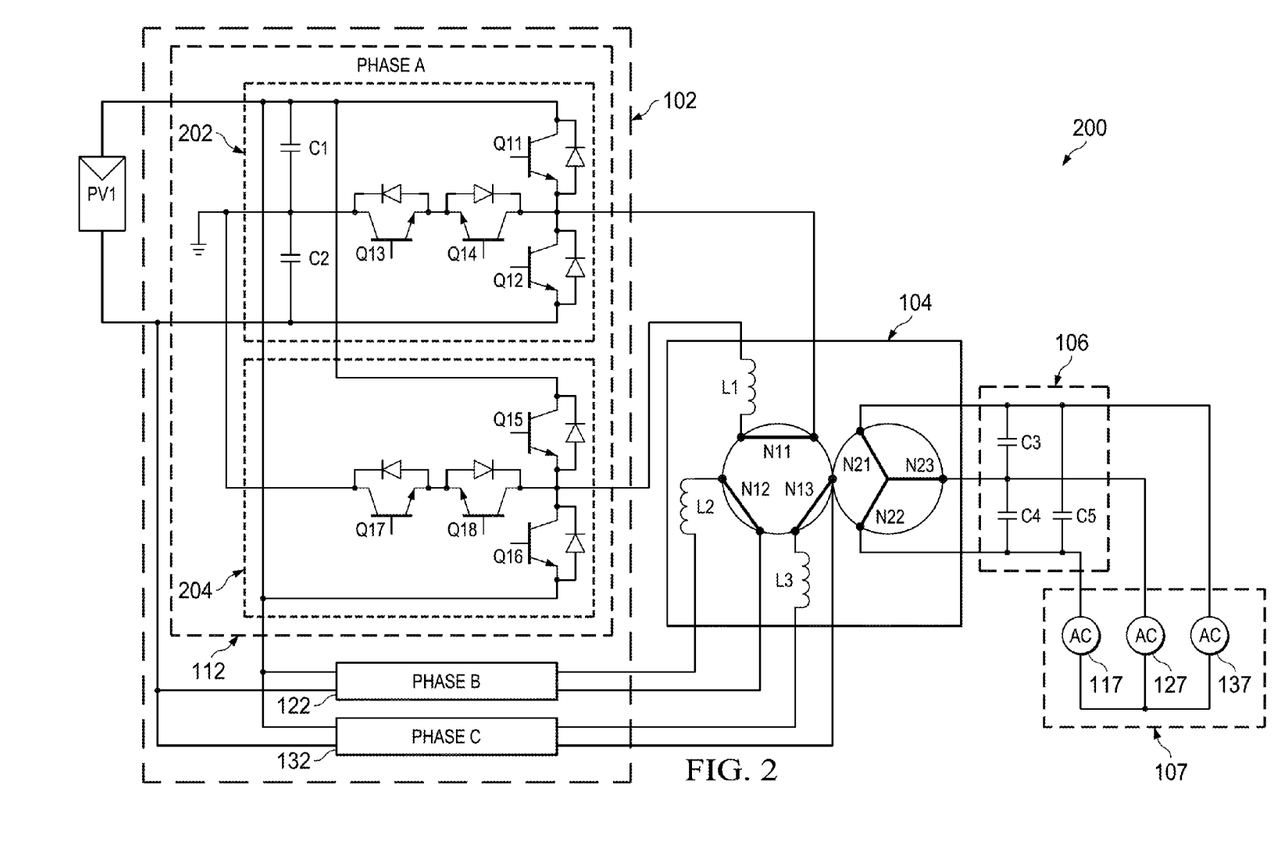
FIG. 2 illustrates a schematic diagram of the multi-level inverter system shown in FIG. 1 in accordance with various embodiments of the present disclosure.

In some embodiments, each phase (e.g., the first phase and the corresponding first five-level inverter 112) includes two phase-shifted three-level inverters (e.g., phase-shifted three-level inverters 202 and 204 shown in FIG. 2). The phase shift between these two three-level inverters (e.g., phase-shifted three-level inverters 202 and 204 shown in FIG. 2) is equal to 180 degrees. In alternative embodiments, the phase shift between these two three-level inverters is equal to 360 degrees divided by N, where N is the order of the most significant harmonic of the multi-level inverter system 100.

It should be noted that the five-level inverters shown in FIG. 1 are selected purely for demonstration purposes and are not intended to limit the various embodiments of the present disclosure to any particular voltage levels. One of ordinary skill in the art would recognize many variations, alternatives, and modifications. For example, each phase can be implemented as a seven-level inverter.

The transformer 104 may comprise three primary windings and three secondary windings. In some embodiments, the primary windings are connected in a delta winding configuration. The secondary windings are connected in a wye winding configuration. The primary windings and the secondary windings may be wound on a same magnetic core (e.g., a five-column magnetic core). The structure of the magnetic core will be discussed in detail with respect to FIG. 7.

The output filter 106 may comprise a plurality of capacitive elements. In some embodiments, the capacitive elements (e.g., capacitors) shunt the inputs of the three-phase load 107 and provide a low impedance channel for the high frequency noise generated from the multi-level inverter system 100. The detailed structure of the output filter 106 will be described below with respect to FIG. 2.

The three-phase load 107 includes three ac loads connected in a wye configuration as shown in FIG. 1. It should be noted that the wye configuration of the three-phase load 107 shown in FIG. 1 is selected purely for demonstration purposes and is not intended to limit the various embodiments of the present disclosure to any particular voltage levels. One of ordinary skill in the art would recognize many variations, alternatives, and modifications. For example, the three ac loads may be connected in a delta configuration.

FIG. 2 illustrates a schematic diagram of the multi-level inverter system shown in FIG. 1 in accordance with various embodiments of the present disclosure. An input dc voltage source PV1 is coupled to the inputs of the multi-level three-phase inverter 102. In order to filter input noise, input capacitors (e.g., C1 and C2) are connected between the two output terminals of the input dc voltage source PV1. More particularly, the input capacitors may comprise a first input capacitor C1 and a second input capacitor C2. The first input capacitor C1 and the second input capacitor C2 are connected in series and further coupled between the two terminals of the input dc voltage source PV1. The common node of the first input capacitor C1 and the second input capacitor C2 is connected to a neutral point as shown in FIG. 2. In some embodiments, the neural point is the ground of the multi-level inverter system 200.

The multi-level three-phase inverter 102 comprises three phases, namely phase A, phase B and phase C. In some embodiments, phases A, B and C may be of a same structure. For simplicity, only the detailed structure of phase A will be described below.

Phase A of the multi-level three-phase inverter 102 comprises a first T-type inverter 202 and a second T-type inverter 204. The inputs of the T-type inverters 202 and 204 are connected to the input dc voltage source PV1 as well as the input capacitors C1 and C2. The outputs of the T-type inverters 202 and 204 are connected to a primary winding of the transformer 104.

The T-type inverters 202 and 204 shown in FIG. 2 are commonly known as T-type three-level inverters. It should be noted that while FIG. 2 shows phase A is formed by two T-type three-level power inverters, it is within the scope and spirit of the disclosure for the multi-level inverter system 200 to comprise other inverters, such as, but no limited to two-level inverters, three-level inverters any combinations thereof and/or the like.

The first T-type inverter 202 comprises a pair of switching elements Q11 and Q12 connected in series. The common node of the switching elements Q11 and Q12 are coupled to ground through an isolation device formed by back-to-back connected switching elements Q13 and Q14. The back-to-back connected switching elements Q13 and Q14 are capable of completely isolating the common node of the switching elements Q11 and Q12 from ground. According to some embodiments, switching elements Q11, Q12, Q13 and Q14 are IGBT or IGBTs connected in parallel, series and any combinations thereof.

Switching elements Q11, Q12, Q13 and Q14 are so controlled that the output of the first T-type inverter 202 generates a three level waveform. In particular, when switching element Q11 is turned on and switching element Q12 is turned off, the output of the first T-type inverter 202 generates a positive voltage equal to one half of the voltage across the input dc voltage source PV1. Likewise, when switching element Q12 is turned on and switching element Q11 is turned off, the output of the first T-type inverter 202 generates a negative voltage equal to one half of the voltage across the input dc voltage source PV1. When both switching elements Q11 and Q12 are turned off and switching elements Q13 and Q14 are turned on, the output of the first T-type inverter 202 is coupled to ground. As such, the output of the first T-type inverter 202 generates a three-level voltage waveform. The frequency of the three-level voltage waveform is approximately 60 HZ in accordance with an embodiment.

The second T-type inverter 204 comprises switching elements Q15, Q16, Q17 and Q18. The operation principle of the second T-type inverter 204 is similar to that of the first T-type inverter 202, and hence is not discussed again to avoid repetition.

In some embodiments, the switching elements (e.g., Q11-Q14 and Q15-Q18) of each T-type inverter shown in FIG. 2 are so controlled that there is a phase shift between the output waveforms of the first T-type inverter 202 and the second T-type inverter 204. For example, by controlling the timing of the switching elements Q11-Q14 and the timing of the switching elements Q15-Q18, a first phase shift may be placed between the outputs of the first T-type inverter 202 and the second T-type inverter 204. Likewise, by controlling the timing of the switching elements of phase B, a second phase shift may be placed between the two outputs of the T-type inverters of phase B. Similarly, by controlling the timing of the switching elements of phase C, a third phase shift may be placed between the two outputs of the T-type inverters of phase C.

Due to the first phase shift, the voltage waveform applied to the winding N11 is not a three-level waveform. Instead, the voltage waveform across the winding N11 has a number of voltage levels greater than three. The number of voltage levels of the multi-level waveform applied to the winding N11 may vary depending on the degrees of the phase shifts. In some embodiments, the number of levels of the multi-level waveform is equal to five. An example of a five-level waveform generated by one phase of the multi-level inverter system 200 is shown in FIG. 3.

Figure 3:
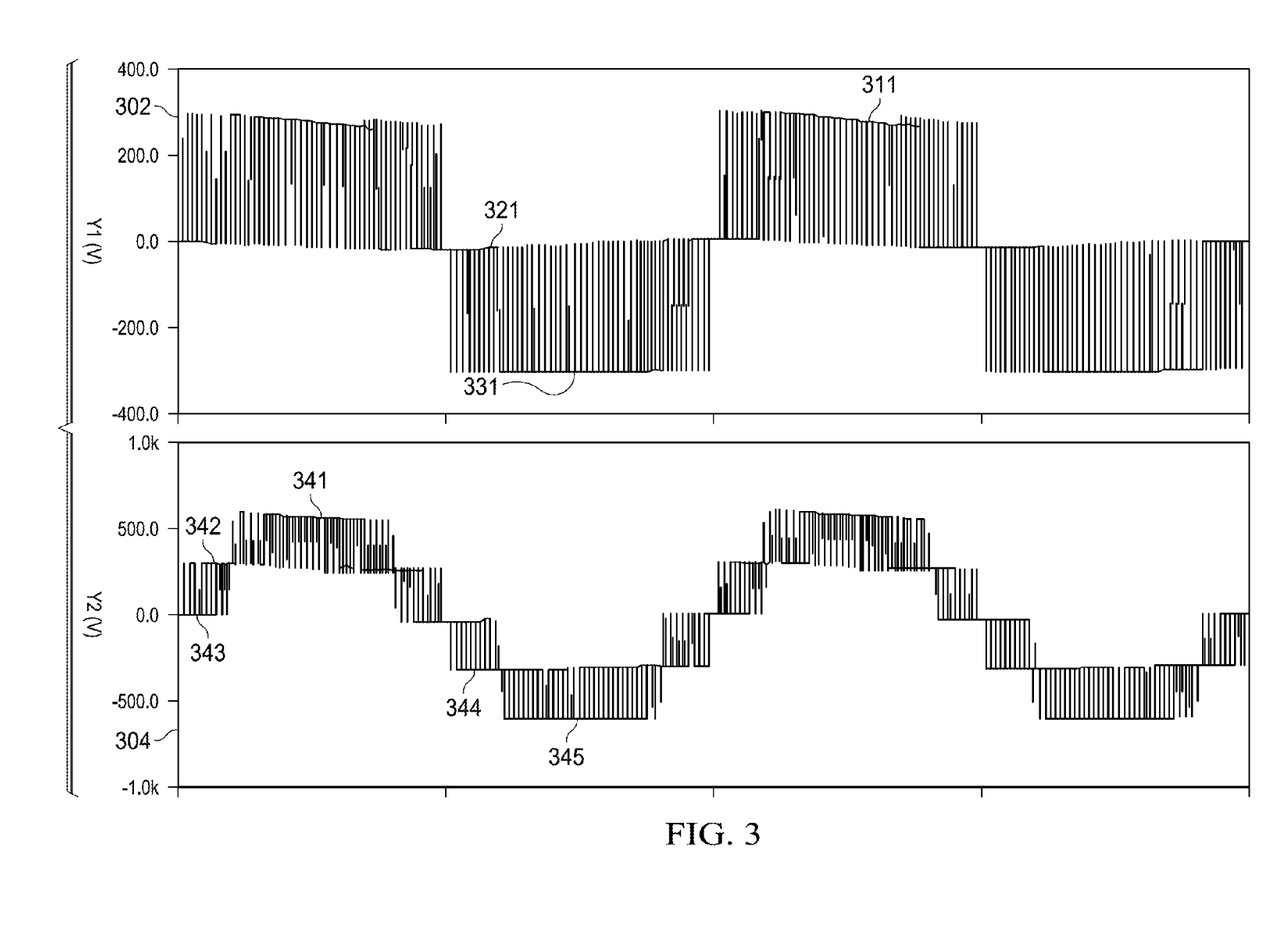
FIG. 3 illustrates various waveforms of the multi-level inverter shown in FIG. 2 in accordance with various embodiments of the present disclosure.

One advantageous feature of having the multi-level waveform (e.g., five-level waveform shown in FIG. 3) is that the multilevel waveform shown in FIG. 3 follows the sinusoidal waveform. As a result, the harmonic contents are less.

Another advantageous feature of having the multi-level waveform (e.g., five-level waveform in FIG. 3) is that the multilevel waveform helps to simplify the design of the output filter. The leakage inductance (e.g., L1, L2 and L3) of the transformer 104 may be used to attenuate the reduced harmonic contents. It is not necessary to have a filter placed between the T-type inverters and the transformer 104. The outputs of the first T-type inverter 202 and the second T-type inverter 204 can be connected to the transformer 104 directly. In comparison with a conventional inverter system, the output filters placed between the inverters and the transformer have been removed. As a result, the total system cost of the multi-level inverter system is reduced accordingly.

Another advantageous feature of the system configuration of FIG. 2 is that the current flowing through the first T-type inverter 202 is equal to the current flowing through the second T-type inverter 204 because these two T-type inverters are connected together through the winding N11. The equal current sharing between the two T-type inverters 202 and 204 helps to simplify the IGBT component selection process for these two T-type inverters.

The transformer 104 comprises three primary windings N11, N12 and N13, and three secondary windings N21, N22 and N23. A first primary winding N11 is connected between two outputs of the three-level inverters of phase A. A second primary winding N12 is connected between two outputs of the three-level inverters of phase B. A third primary winding N13 is connected between two outputs of the three-level inverters of phase C. As shown in FIG. 2, windings N11, N12 and N13 are connected in a delta winding configuration. The secondary windings N21, N22 and N23 are connected to the three-phase load 107 through the output filter 106. In some embodiments, windings N21, N22 and N23 are connected in a wye winding configuration as shown in FIG. 2.

The windings of the transformer 104 may generate leakage magnetic flux. In an equivalent circuit of a transformer, the leakage magnetic flux is replaced by a leakage inductance. Such a leakage inductance may function as inductive elements to attenuate noise. As shown in FIG. 2, there may be three leakage inductances L1, L2 and L3. L1 is connected to phase A; L2 is connected to phase B; L3 is connected to phase C.

The output filter 106 may comprise three capacitors C3, C4 and C5. As shown in FIG. 2, C3 is connected between windings N21 and N23; C4 is connected between windings N22 and N23; C5 is connected between windings N21 and N22. The capacitors C3, C4 and C5 shunt the inputs of the three-phase load 107 and provide low impedance channels for the high frequency noise generated from the multi-level inverter system 200.

It should be noted that the inverter topologies, the output filter 106, the input dc power source PV1 and the three-phase load shown in FIG. 2 are provided for illustrative purposes only, and are provided only as examples of various embodiments. Such examples should not unduly limit the scope of the claims. One of ordinary skill in the art would recognize many variations, alternatives, and modifications.

FIG. 3 illustrates various waveforms of the multi-level inverter shown in FIG. 2 in accordance with various embodiments of the present disclosure. The horizontal axis of FIG. 3 represents intervals of time. The unit of the horizontal axis is millisecond. There may be two vertical axes. The first vertical axis Y1 represents the voltage at an output of a three-level inverter (e.g., three-level inverter 202 shown in FIG. 2). The second vertical axis Y2 represents the voltage across a winding of the transformer 104 (e.g., winding N11 shown in FIG. 2).

Waveform 302 shows the voltage at the output of a three-level inverter (e.g., the common node of Q11 and Q12 shown in FIG. 2). Waveform 302 includes three voltage levels. A first voltage level 311 is about 300 V; a second voltage level 321 is about 0 V; a third voltage level 331 is about −300 V. As shown in FIG. 3, waveform 302 is a staircase waveform and symmetrical at the 180° axis. In other words, the waveform of the negative half cycle is merely inverted from that of the positive half cycle with the same spacing. Furthermore, in a half cycle (e.g., the positive half cycle), waveform 302 is symmetrical about the 90° axis.

Waveform 304 shows the voltage across a winding of the transformer (e.g., winding N11 shown in FIG. 2). Waveform 304 is generated based upon two phase shifted three-level waveforms. Waveform 304 includes five voltage levels. A first voltage level 341 is about 600 V; a second voltage level 342 is about 300 V; a third voltage level 343 is about 0 V; a fourth voltage level 344 is about −300 V; a fifth voltage level 345 is about −600 V. As shown in FIG. 3, waveform 304 is a staircase waveform and symmetrical at the 180° axis. In other words, the waveform of the negative half cycle is merely inverted from that of the positive half cycle with the same spacing. Furthermore, in a half cycle (e.g., the positive half cycle), waveform 304 is symmetrical about the 90° axis.

One advantageous feature of having a multilevel inverter such as a five-level inverter shown in FIG. 2 is that the staircase waveform (e.g., waveform 304) shown in FIG. 3 resembles a sinusoidal waveform. Therefore, the five-level inverter may generate an ac waveform with low distortion. The low distortion helps to achieve a low total harmonic distortion (THD) for the five-level inverter. Such a low THD helps to reduce the size of the filter of the inverter system.

Another advantageous feature of having a multi-level inverter such as a five-level inverter shown in FIG. 2 is that the amplitude of the output voltage of the staircase waveform (e.g., waveform 304) shown in FIG. 3 is two times greater than the amplitude of the output voltage of a conventional three-level waveform. As a result, the current flowing through the five-level inverter is reduced by 50% if the output load is maintained the same. Such a lower current helps to improve the efficiency of the five-level inverter system.

Figure 4:
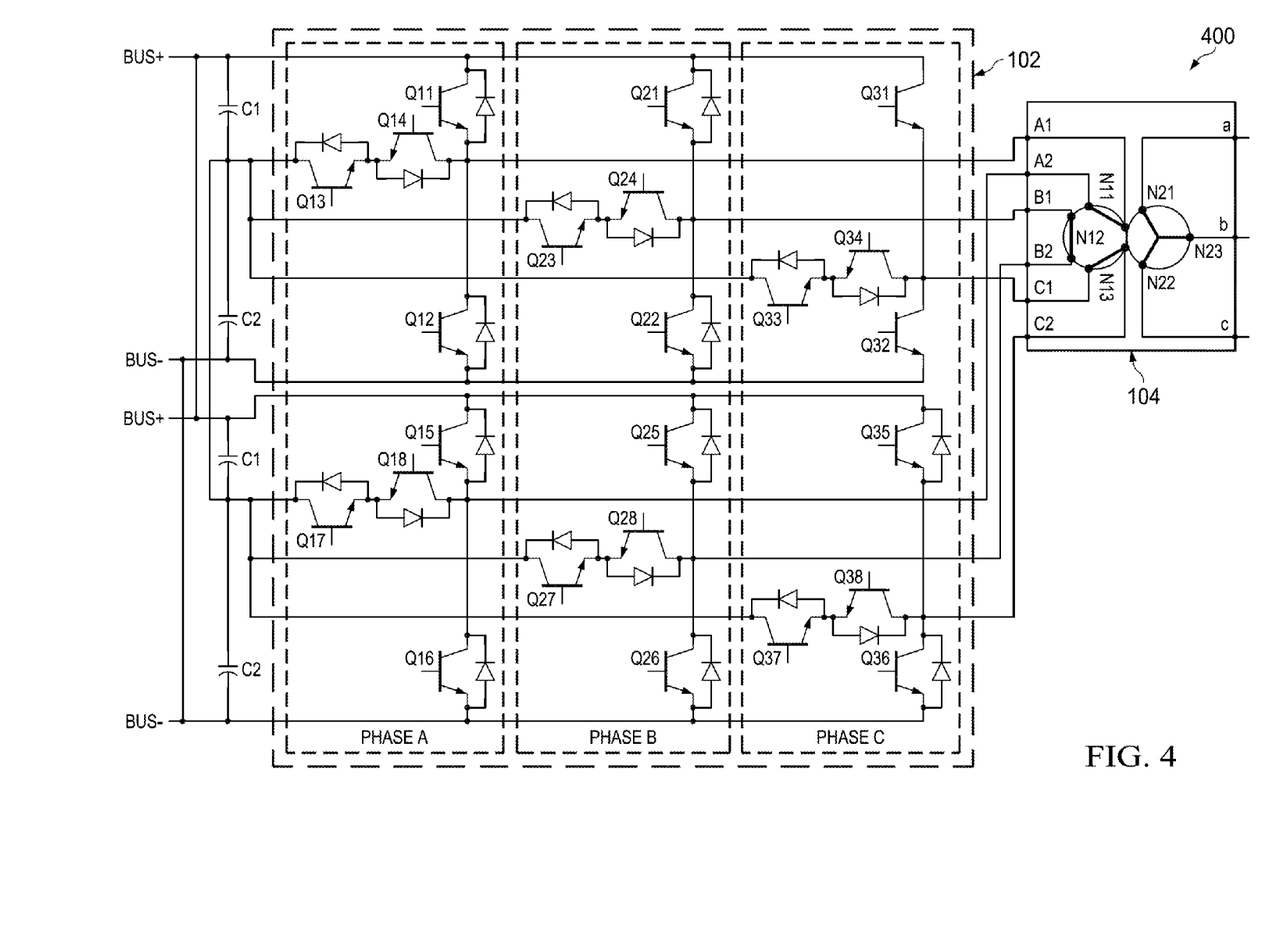
FIG. 4 illustrates a schematic diagram of a three-phase multi-level inverter system in accordance with various embodiments of the present disclosure.

FIG. 4 illustrates a schematic diagram of a three-phase multi-level inverter system in accordance with various embodiments of the present disclosure. The three-phase multi-level inverter system 400 includes three phases, namely phase A, phase B and phase C. Each phase includes two three-level inverters connected together through a winding of the transformer 104. As shown in FIG. 4, phase A includes switches Q11-Q18. Switches Q11, Q12, Q13 and Q14 form the first T-type inverter of phase A. Switches Q15, Q16, Q17 and Q18 form the second T-type inverter of phase A. As shown in FIG. 4, the first T-type inverter of phase A is connected to terminal A1 of the transformer 104. The second T-type inverter of phase A is connected to terminal A2 of the transformer 104. Terminals A1 and A2 are connected to the two terminals of the winding N11 respectively.

Phase B includes switches Q21-Q28. Switches Q21, Q22, Q23 and Q24 form the first T-type inverter of phase B. Switches Q25, Q26, Q27 and Q28 form the second T-type inverter of phase B. As shown in FIG. 4, the first T-type inverter of phase B is connected to terminal B1 of the transformer 104. The second T-type inverter of phase B is connected to terminal B2 of the transformer 104. Terminals B1 and B2 are connected to the two terminals of the winding N12 respectively.

Phase C includes switches Q31-Q38. Switches Q31, Q32, Q33 and Q34 form the first T-type inverter of phase C. Switches Q35, Q36, Q37 and Q38 form the second T-type inverter of phase C. As shown in FIG. 4, the first T-type inverter of phase C is connected to terminal C1 of the transformer 104. The second T-type inverter of phase C is connected to terminal C2 of the transformer 104. Terminals C1 and C2 are connected to the two terminals of the winding N12 respectively. Terminals a, b and c are connected to the filter 106.

The structure and operation principle of phase A has been discussed in detail above with respect to FIG. 2. The structures of phase B and phase C are similar to that of phase A, and hence are not discussed in detail herein.

Figure 5:
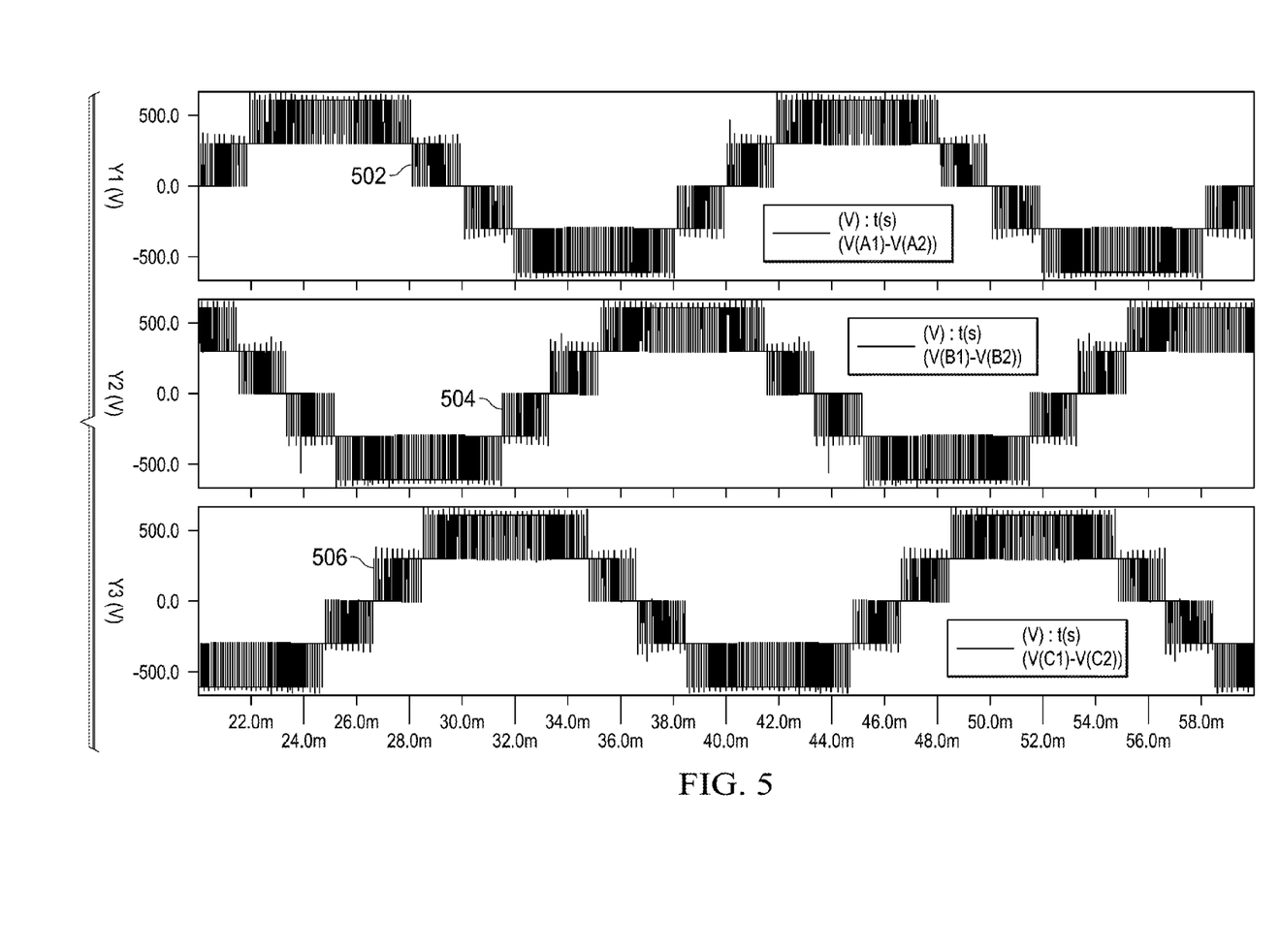
FIG. 5 illustrates various waveforms associated with the three-phase multi-level inverter system shown in FIG. 4 in accordance with various embodiments of the present disclosure.

FIG. 5 illustrates various waveforms associated with the three-phase multi-level inverter system shown in FIG. 4 in accordance with various embodiments of the present disclosure. The horizontal axis of FIG. 5 represents intervals of time. The unit of the horizontal axis is millisecond. There may be three vertical axes. The first vertical axis Y1 represents the voltage across the winding N11. The second vertical axis Y2 represents the voltage across the winding N12. The third vertical axis Y3 represents the voltage across the winding N13.

FIG. 5 shows three waveforms. The first waveform 502 is the voltage applied to the winding N11 of the transformer 104 shown in FIG. 4. The second waveform 504 is the voltage applied to the winding N12 of the transformer 104 shown in FIG. 4. The third waveform 506 is the voltage applied to the winding N13 of the transformer 104 shown in FIG. 4. As shown in FIG. 5, there is a phase shift of 120 degrees between the first waveform 502 and the second waveform 504. Likewise, there is a phase shift of 120 degrees between the second waveform 504 and the third waveform 506.

Figure 6:
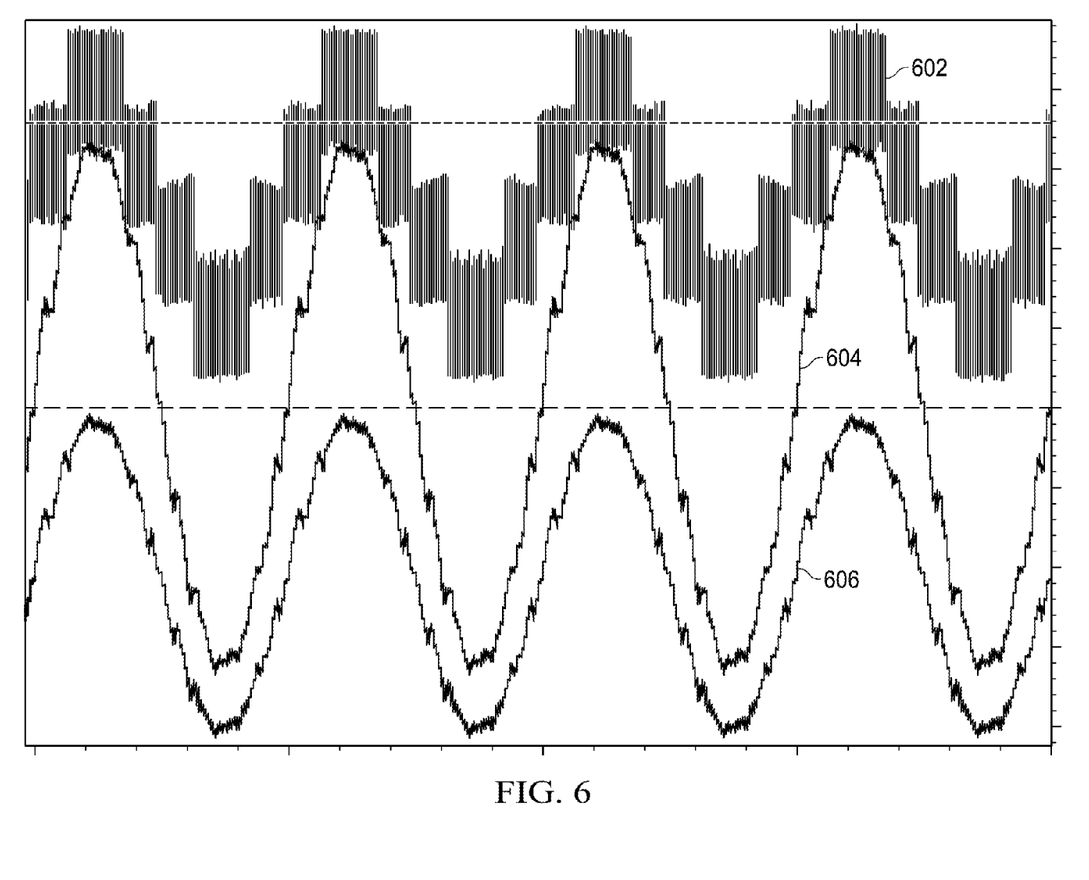
FIG. 6 illustrates various waveforms associated with the three-phase multi-level inverter system shown in FIG. 4 in accordance with various embodiments of the present disclosure.

FIG. 6 illustrates various waveforms associated with the three-phase multi-level inverter system shown in FIG. 4 in accordance with various embodiments of the present disclosure. The horizontal axis of FIG. 6 represents intervals of time. Waveform 602 shows the voltage across a winding (e.g., winding N11 shown in FIG. 4) of the transformer 104. Waveform 602 is generated based upon two phase shifted three-level waveforms. Waveform 602 includes five voltage levels. As shown in FIG. 6, waveform 602 is a staircase waveform and symmetrical at the 180° axis. In other words, the waveform of the negative half cycle is merely inverted from that of the positive half cycle with the same spacing. Furthermore, in a half cycle (e.g., the positive half cycle), waveform 602 is symmetrical about the 90° axis.

The staircase waveform (e.g., waveform 602) shown in FIG. 6 resembles a sinusoidal waveform. Therefore, the five-level inverter may generate an ac waveform with low distortion. The low distortion helps to achieve a low THD for the five-level inverter. Such a low THD helps to reduce the size of the filter of the inverter system.

Waveforms 604 and 606 are the current flowing through the three-phase load and the current flowing through the five-level inverter respectively. As shown in FIG. 6, the current flowing through the three-phase load is in phase with the current flowing through the five-level inverter. In addition, the currents (e.g., waveforms 604 and 606) are in phase with the five-level voltage waveform (e.g., waveform 602).

Figure 7:
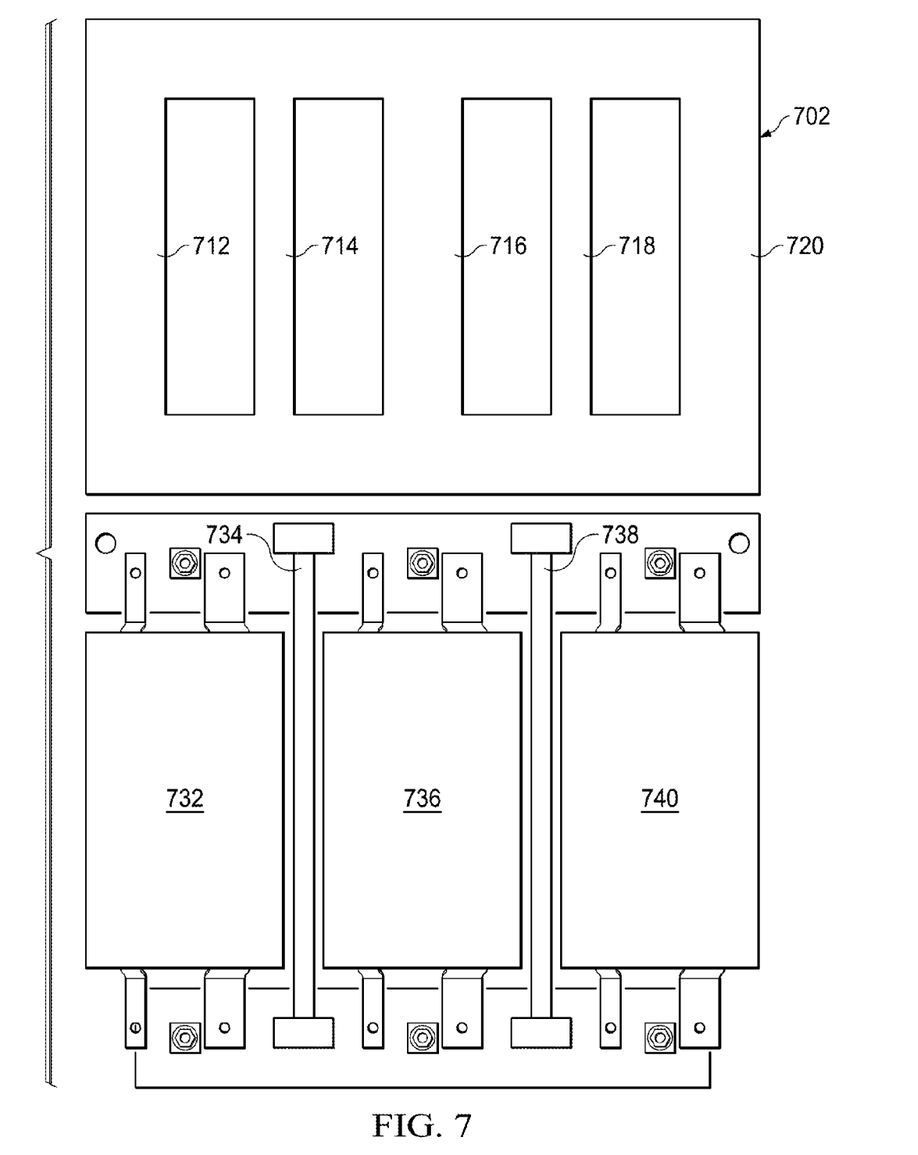
FIG. 7 illustrates an implementation of the transformer shown in FIG. 1 in accordance with various embodiments of the present disclosure.

FIG. 7 illustrates an implementation of the transformer shown in FIG. 1 in accordance with various embodiments of the present disclosure. The transformer 104 may be wound around a magnetic core 702 as shown in FIG. 7. In accordance with an embodiment, the magnetic core is a five-column magnetic core made of suitable materials. In some embodiments, the magnetic material of the magnetic core 702 is selected from magnetic materials having high permeability such as ferrite, powder iron, other power suitable materials, any combinations thereof and/or the like. In alternative embodiments, the magnetic core may be made of suitable alloys such as silicon steel to further reduce the magnetic losses.

In some embodiments, the windings N11 and N21 may be wound around a first column 712. The windings N12 and N22 may be wound around a third column 716. As shown in FIG. 7, the third column 716 and the first column 712 are separated by a second column 714. The windings N13 and N23 may be wound around a fifth column 720. As shown in FIG. 7, the third column 716 and the fifth column 720 are separated by a fourth column 718.

In some embodiments, the columns 712, 716 and 720 are formed by silicon steel sheets. The columns 714 and 712 are formed of silicon steel. A real implementation of the transformer 104 is illustrated at the right side of FIG. 7. As shown in the right side of FIG. 7, there are two windings wound on a left column 732, a middle column 736 and a right column 740. A first silicon steel column 734 is placed between the left column 732 and the middle column 736. A second silicon steel column 738 is placed between the middle column 736 and the right column 740.

One advantageous feature of having the columns 714 and 718 is the columns 714 and 718 provide a common mode magnetic flux path. Such a common mode magnetic flux path helps to increase the common mode leakage impedance. In some embodiments, the common mode leakage impedance can be increased by 200%. As a result, the third harmonic and high order common mode currents can be reduced to about 1% of the output current of the multi-level inverter system.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A system comprising:
 a first five-level inverter comprising a first three-level inverter and a second three-level inverter configured to operate with a first phase shift between the first three-level inverter and the second three-level inverter;
 a second five-level inverter comprising a third three-level inverter and a fourth three-level inverter configured to operate with a second phase shift between the third three-level inverter and the fourth three-level inverter;
 a third five-level inverter comprising a fifth three-level inverter and a sixth three-level inverter configured to operate with a third phase shift between the fifth three-level inverter and the sixth three-level inverter;
 a transformer having three primary windings and three secondary windings, wherein:
  a first primary winding is coupled to the first five-level inverter;
  a second primary winding is coupled to the second five-level inverter; and
  a third primary winding is coupled to the third five-level inverter; and an output filter connected to the three secondary windings.

2. The system of claim 1, wherein:
the primary windings form a delta winding configuration; and
the secondary windings form a wye winding configuration.

3. The system of claim 1, wherein:
the transformer is formed on a five-column magnetic core.

4. The system of claim 3, wherein:
a first primary winding is on a first column;
a second primary winding is on a third column, and wherein the first column and the third column is separated by a second column; and
a third primary winding is on a fifth column, and wherein the fifth column and the third column is separated by a fourth column.

5. The system of claim 4, wherein:
the first column, the third column and the fifth column are formed by silicon steel sheets; and
the second column and the fourth column are formed of silicon steel.

6. The system of claim 5, wherein:
the first three-level inverter is a three-level T-type inverter.

7. The system of claim 6, wherein the three-level T-type inverter comprises:
a first switch and a second switch connected in series between two terminals of an input dc power source; and
a third switch and a fourth switch connected back-to-back between a common node of the first switch and the second switch, and a neutral point.

8. The system of claim 1, wherein:
the first primary winding has a first terminal connected to an output of the first three-level inverter and a second terminal connected to an output of the second three-level inverter;
the second primary winding has a first terminal connected to an output of the third three-level inverter and a second terminal connected to an output of the fourth three-level inverter; and
the third primary winding has a first terminal connected to an output of the fifth three-level inverter and a second terminal connected to an output of the sixth three-level inverter.

9. The system of claim 1, wherein:
the output filter comprises a first capacitor coupled between a first secondary winding and a second secondary winding, a second capacitor coupled between the second secondary winding and a third secondary winding, and a third capacitor coupled between the first secondary winding and the third secondary winding.

10. A system comprising:
a first T-type inverter and a second T-type inverter connected to a dc power source, wherein the second T-type inverter is configured to operate with a first phase shift from the first T-type inverter, and wherein the first T-type inverter and the second T-type inverter are connected to a first winding of a transformer;
a third T-type inverter and a fourth T-type inverter connected to the dc power source, wherein the fourth T-type inverter is configured to operate with a second phase shift from the third T-type inverter, and wherein the third T-type inverter and the fourth T-type inverter are connected to a second winding of the transformer; and
a fifth T-type inverter and a sixth T-type inverter connected to the dc power source, wherein the sixth T-type inverter is configured to operate with a third phase shift from the fifth T-type inverter, and wherein the fifth T-type inverter and the sixth T-type inverter are connected to a third winding of the transformer.

11. The system of claim 10, wherein:
the first winding, the second winding and the third winding are connected in a delta winding configuration.

12. The system of claim 10, further comprising:
an output filter coupled to secondary windings of the transformer.

13. The system of claim 10, wherein the transformer comprises:
a magnetic core comprising a first column, a second column, a third column, a fourth column and a fifth column;
the first winding wound around the first column;
the second winding wound around the third column; and
the third winding wound around the fifth column, wherein the second column is between the first column and the third column, and the fourth column is between the third column and the fifth column.

14. The system of claim 10, wherein the first T-type inverter comprises:
a first switching element;
a second switching element, wherein:
the second switching element and the first switching element are connected in series; and
a common node of the first switching element and the second switching element is an output of the first T-type inverter; and
a first isolation switch comprising two back-to-back connected switching elements, wherein the first isolation switch is coupled between the output of the first T-type inverter and ground.

15. The system of claim 14, wherein:
the first T-type inverter is configured to generate a three-level waveform at the common node of the first switching element and the second switching element.

16. The system of claim 10, wherein:
the first T-type inverter generates a first three-level waveform; and
the second T-type inverter generates a second three-level waveform, and wherein a five-level waveform is generated based upon the first three-level waveform and the second three-level waveform and the five-level waveform is applied to the first winding.

17. A three-phase inverter system comprising:
a first phase comprising a first three-level inverter and a second three-level inverter connected together through a first winding of a transformer, wherein the first three-level inverter is configured to operate with a first phase shift from the second three-level inverter;
a second phase comprising a third three-level inverter and a fourth three-level inverter connected together through a second winding of the transformer, wherein the third three-level inverter is configured to operate with a second phase shift from the fourth three-level inverter;
a third phase comprising a fifth three-level inverter and a sixth three-level inverter connected together through a third winding of the transformer, wherein the fifth three-level inverter is configured to operate with a third phase shift from the sixth three-level inverter; and
the transformer having primary side windings connected to the first phase, the second phase and the third phase respectively and secondary side windings connected to an output filter.

18. The three-phase inverter system of claim 17, wherein:
a primary side of the transformer comprises the first winding, the second winding and the third winding, and wherein the primary side is in a delta winding configuration; and
a secondary side of the transformer comprises a fourth winding, a fifth winding and a sixth winding, and wherein the second side is in a wye winding configuration.

19. The three-phase inverter system of claim 18, wherein: the output filter comprises a first capacitor connected between the fourth winding and the fifth winding, a second capacitor connected between the fifth winding and the sixth winding, and a third capacitor connected between the sixth winding and the fourth winding.

20. The three-phase inverter system of claim 18, wherein the transformer is formed on a magnetic core comprising five columns, and wherein:
the first winding and the fourth winding are on a first column;
the second winding and the fifth winding are on a third column, and wherein the first column and the third column are separated by a second column; and
the third winding and the sixth winding are on a fifth column, and wherein the fifth column and the third column are separated by a fourth column.

* * * * *